United States Patent [19]

Reynolds

[11] Patent Number: 5,222,405
[45] Date of Patent: Jun. 29, 1993

[54] INFINITELY-VARIABLE POSITIVE DRIVE TRANSMISSION

[76] Inventor: Harry W. Reynolds, 5307 Buckhead Trail, Knoxville, Tenn. 37919

[21] Appl. No.: 930,316

[22] Filed: Aug. 11, 1992

[51] Int. Cl.⁵ .......................... F16H 3/22; F16H 35/02
[52] U.S. Cl. .......................................... 74/351; 74/393
[58] Field of Search ............... 74/348, 351, 393, 665 F

[56] References Cited

U.S. PATENT DOCUMENTS

| | | | |
|---|---|---|---|
| 955,279 | 4/1910 | Moore | 74/351 |
| 2,870,644 | 1/1959 | Winter | 74/351 |
| 3,075,397 | 1/1963 | Winter | 74/351 X |
| 4,050,324 | 9/1977 | Teyssandier | 74/393 X |
| 4,447,068 | 5/1984 | Brooks | 74/351 X |
| 4,813,302 | 3/1989 | Davidow | 74/351 |
| 5,065,638 | 11/1991 | Barens | 74/351 |

*Primary Examiner*—Dirk Wright
*Attorney, Agent, or Firm*—Michael E. McKee

[57] ABSTRACT

A transmission including at least two shafts and a cylindrical member supported by a frame for rotation relative thereto about axes of rotation utilizes a pair of gears and a plurality of speed-adjusting teeth for altering the relative speed of rotation between the shafts and the cylindrical member. Each of the gears is connected to a corresponding one of the shafts for rotation therewith, and the shafts are appropriately coupled to one another so that rotation of one shaft effects a rotation of the other shafts. The speed-adjusting teeth are disposed about the cylindrical member and cooperatively mesh with the gears for transmitting rotary motion between the shafts and cylindrical member and so that at any rotational position of the cylindrical member about its axis of rotation, the speed-adjusting teeth are in meshed relationship with at least one of the gears. The speed-adjusting teeth are connected to the cylindrical member for movement along the length thereof and cooperate with the gears so that as the teeth are moved along the elongated member, the teeth maintain the meshed relationship with at least one of the gears for transmitting rotary motion between the shafts and the cylindrical member and so that by moving the speed-adjusting teeth along the length of the cylindrical member during rotation of the shafts and cylindrical member effects an adjustment in the relative speed of rotation between the shafts and the cylindrical member.

20 Claims, 5 Drawing Sheets

INFINITELY-VARIABLE POSITIVE DRIVE TRANSMISSION

BACKGROUND AND SUMMARY OF THE INVENTION

This invention relates generally to transmissions and more particularly is concerned with an infinitely variable, positive drive transmission for varying the speed between a driving shaft and a driven shaft.

It is an object of the present invention to provide a new and improved transmission of a positive drive class.

Another object of the present invention is to provide such a transmission which is uncomplicated in construction and effective in operation.

This invention resides in a transmission including a frame, a plurality of shafts journaled within the frame for rotation with respect thereto and coupled to one another so that rotation of one shaft about its axis of rotation effects a rotation of each other shaft about its axis of rotation. A plurality of gears are attached to the shafts for rotation therewith wherein each gear is associated within a corresponding one of the shafts and the gears are in spaced relation with one another. An elongated member is journaled within the frame for rotation relative thereto. A plurality of teeth is disposed about the circumference of the elongated member so as to be positioned in meshed relationship with at least one of the gears at any rotational position of the elongated member about its axis of rotation for transmitting rotary motion between the gears and the teeth as a prescribed shaft or the elongated member is rotated relative to the frame. The teeth are connected to the elongated member for movement along the length thereof between two positions therealong and cooperable with the gears so that as the teeth are moved along the elongated member between the two positions, the teeth maintain the meshed relationship with at least one of the gears as aforesaid and the distance between the axes of rotation of the shafts is altered. The transmission also includes means for moving the teeth along the length of the elongated member so that as the distance between the teeth and the axes of shaft rotation is altered and rotary motion is transmitted between a preselected shaft and the elongated member, the relative speed of rotation between the preselected shaft and the elongated member is altered.

DETAILED DESCRIPTION OF THE ILLUSTRATED EMBODIMENT

Figure 1:
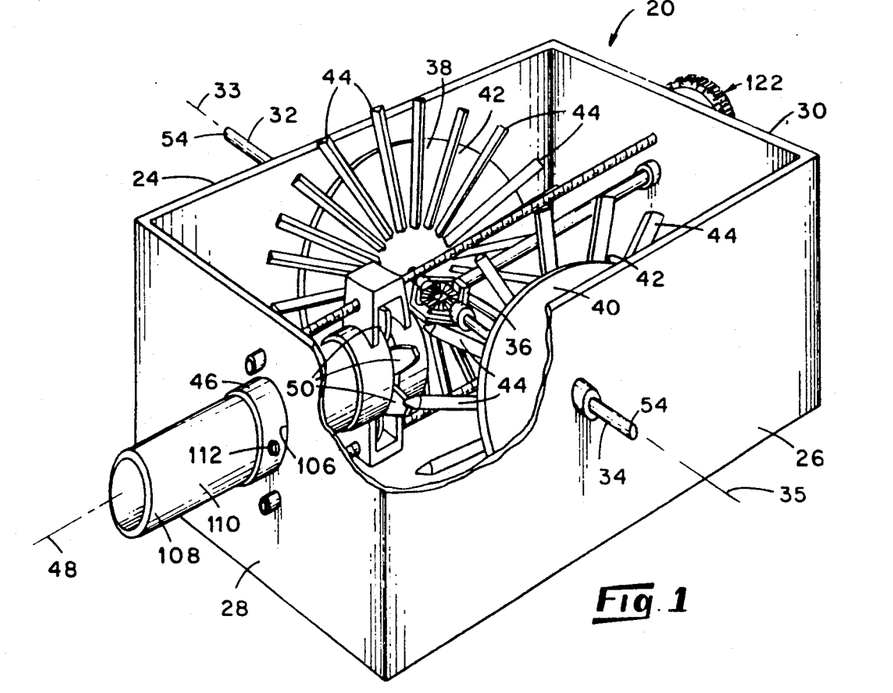
FIG. 1 is a perspective view of one embodiment of a transmission, shown partially cut-away.
Figure 2:
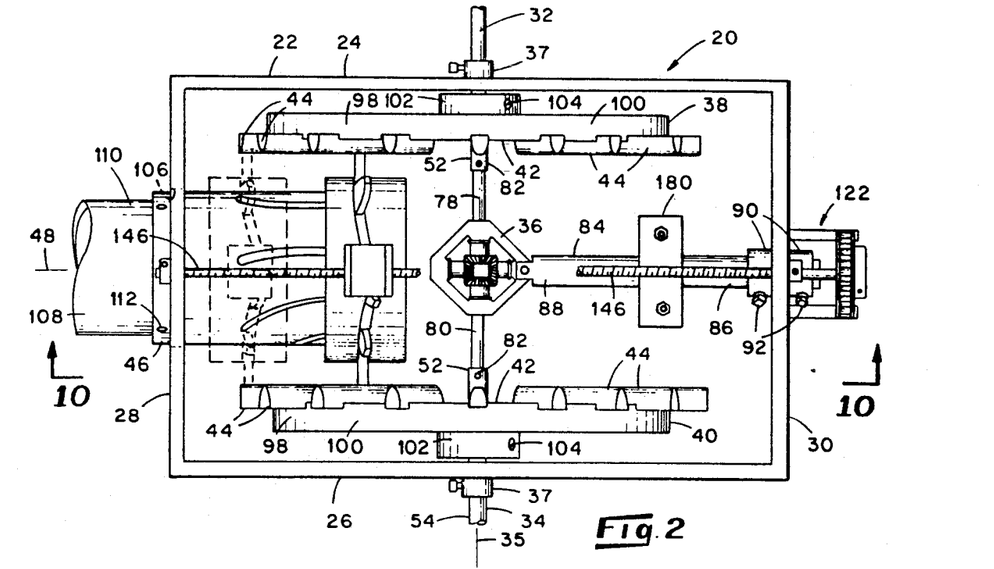
FIG. 2 is a top plan view of the FIG. 1 embodiment, shown partially cut-away.

Turning now to the drawings in greater detail and considering first FIGS. 1 and 2, there is shown a transmission 20 within which features of the present invention are embodied. The transmission 20 includes a box-like frame 22 having two opposite sidewalls 24, 26 and two opposite end walls 28, 30. Two shafts 32, 34 are each journaled within a corresponding one of the sidewalls 24 or 26 for rotation about an axis 33 or 35. The shafts 32, 34 are coupled by means of a gear assembly 36 so that rotation of one shaft 32 or 34 about its rotation axis 33 or 35 effects rotation of the other shaft 34 or 32 about its rotation axis 35 or 33. Affixed about each shaft 32 or 34 is a gear 38 or 40 having a face 42 and a plurality of teeth 44 disposed across its face 42.

The transmission 20 also includes an elongated cylindrical member 46 rotatably mounted within the end wall 28 for rotation about an axis 48 and a plurality of teeth 50 associated with the member 46 which cooperatively mesh with the teeth of the gears 38 and 40 so that rotation of the tubular member 46 about its axis 48 effects rotation of each gear 38 or 40 about its corresponding axis 33 or 35. As will be apparent herein, the teeth 50 are movable relative to and along the length of cylindrical member 46 so that the relative speed of rotation between the shafts 32, 34 and the cylindrical member 46 is altered.

As best shown in FIG. 2, each of the shafts 32 or 34 has an end portion 52 which extends through an opening provided within a corresponding sidewall 24 or 26 of the frame 22 for rotation within the sidewall opening about its axis 33 or 35. If desired, a bearing may be positioned about the shaft 32 or 34 and within the sidewall opening to facilitate the rotation of shaft 32 or 34 relative to the corresponding sidewall 24 or 26. In the depicted embodiment 20, the shafts 32, 34 are secured within a corresponding sidewall 24 or 26 by means of a collar 37 and the gear 38 or 40 affixed about the shaft 32 or 34 and positioned on opposite sides of the sidewall 24 or 26. As will be apparent herein, the shafts 32, 34 are accessible outside of the frame 22 for connection to a driving or driven shaft (not shown).

Figure 3:
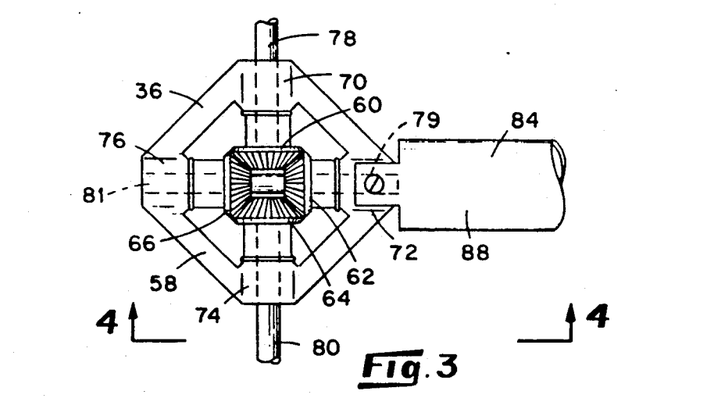
FIG. 3 is a view similar to that of FIG. 2 of a fragment of the FIG. 1 embodiment drawn to a slightly larger scale.
Figure 4:
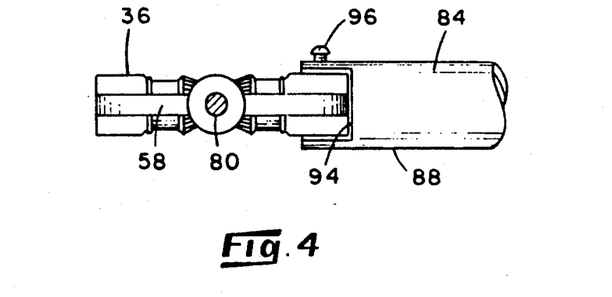
FIG. 4 is a cross sectional view of the FIG. 3 fragment taken about on line 4—4 of FIG. 3.

With reference to FIGS. 3 and 4, the gear assembly 36 includes a frame 58 and a plurality of bevel gears 60, 62, 64, 66 supported by the frame 58 and intermeshed so that rotation of one gear 60, 62, 64, or 66 effects rotation of the other gears 60, 62, 64, or 66. In the depicted gear assembly 36, the frame 58 is somewhat square in shape having opposite corner portions 70, 72 and another set of opposite corner portions 74, 76 joined to the adjacent corner portions 70, 72 along the sides of the frame 58. Each gear 60, 62, 64 or 66 is fixedly secured about a shaft 78, 79, 80 or 81, as with a set screw, and each shaft 78, 79, 80 or 81 is, in turn, journaled within a bearing mounted within a corresponding corner portion 70, 72, 74 or 76 so that the gears 60, 62, 64, 66 are positioned within the frame 58 and are intermeshed with one another as shown in FIG. 3. In the depicted gear assembly 36, two shafts 78 and 80 are arranged in a colinear relationship, and the remaining two shafts 79 and 81 are arranged in a colinear relationship. It follows that by rotating one shaft 78 or 80 in one rotational direction relative to the frame 58, the other shaft 80 or 78 rotates in the opposite rotational direction relative to the frame 58.

With reference again to FIG. 2, the gear assembly 36 is positioned within the frame 22 so that the shafts 78, 80 are aligned with and attached to the shafts 32, 34. To this end, each shaft 32 or 34 includes a recess opening out of its end portion 52, and the shafts 78, 80 have ends which are received by these recesses. A set screw 82 is threaded within an internally-threaded opening formed in a side of each shaft 32 or 34 and tightened against the shaft 78 or 80 to thereby secure the shaft 78 or 80 to the corresponding shaft end portion 52. It follows that rotation of either shaft 32 or 34 relative to the frame 22 about its rotation axis 33 or 35 effects, by way of the gear assembly 36, a rotation of the other shaft 34 or 32 about its rotation axis 35 or 33. More specifically, rotation of one of the shafts 32 or 34 in one rotational direction about its axis 33 or 35 effects a rotation of the other of the shafts 34 or 32 in the opposite rotational direction about its axis 35 or 33.

To stabilize and maintain the frame 58 of the gear assembly 36 in a stationary condition within the frame 22, there is provided a shaft 84 secured at one end 86 to the end wall 30 of the frame 22 and secured at its other end 88 about the frame 58. More specifically and as best shown in FIG. 2, the end 86 of the shaft 84 extends through an opening formed in the end wall 30 and is secured thereto with collars 90 positioned about the shaft 84 on opposite sides of the end wall 30 and secured to the shaft 84 with set screws 92. The other shaft end 88 has a notch 94 (FIG. 4) within which a section of the frame 58 is positioned and is secured to the frame 58 with a set screw 96 received by a threaded opening formed in the shaft end 88 and tightened against the frame 58.

Figures 5, 6:
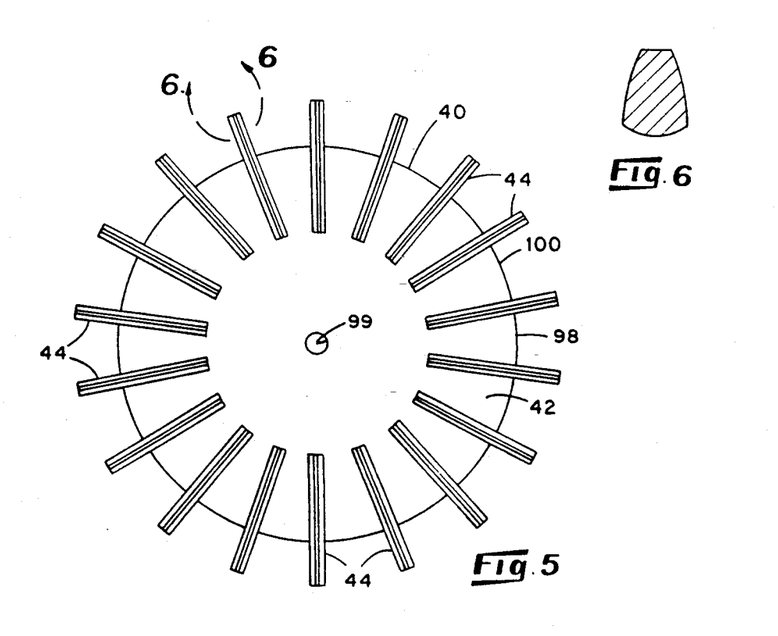
FIG. 5 is a front elevational view of the face of one of the gears of the FIG. 1 embodiment.
FIG. 6 is a cross-sectional view taken along line 6—6 of FIG. 5.

With reference to FIGS. 2 and 5, each gear 38 or 40 includes a body 98 having a plate-like portion 100 providing the face 42 and a collar portion 102 fixedly joined to the plate-like portion 100 on the side thereof opposite the face 42. The gear body 98 includes a central through-opening 99 through which the shaft 32 or 34 extends, and the body 98 is secured in a fixed relationship upon the shaft 32 or 34 with a set screw 104 which extends through a threaded opening provided in the collar portion 102 and tightened against the shaft 32 or 34. As best shown in FIG. 5, each tooth 44 of each gear 38 or 40 is somewhat elongated in shape and is attached to the gear body 98 so as to extend generally radially across the face 42 from a location adjacent the mid-section of the face 42 to a location disposed outboard of the perimeter of the face 42. The teeth 44 are regularly spaced about the center of the face 42 and so that the spacing between adjacent teeth 44 increases in width as a path is traced radially across the face 42. As best shown in FIG. 6, each tooth 44 has a cross section bounded by straight edges as in a standard 20° rack tooth, adapted to properly mate with the edges of the teeth 50. If desired, the teeth 44 can be integrally joined to the gear body 100 in a molding or machining process. Alternatively, the gear body 100 can be constructed separately from the teeth 44, and the teeth 44 can subsequently be attached to the gear body 100 as with welds or screws. The gears 38, 40, as well as other components of the transmission 20, can be constructed of any of a number of suitable materials, such as steel.

With reference again to FIG. 2, the cylindrical member 46 is in the form of a tubular member which extends through a preformed opening 106 provided within the end wall 28 of the frame 22 to a position disposed substantially midway between the gears 38 and 40. The member 46 can be rotated within the end wall opening 106 and, accordingly, has a diameter which is slightly smaller than that of the opening 106. There is also provided another tubular member 108 having an end portion 110 which is positioned within the cylindrical member 46 and secured thereto with a set screw 112 threadably received by an aperture provided in one side of the cylindrical member 46 and tightened against the tubular member 108. As will be apparent herein, the tubular member 108 is accessible for connection to a driving or driven shaft (not shown) for rotation of the tubular member 108 and cylindrical member 46 together about the rotation axis 48.

It is a feature of the transmission 20 that the cylindrical member 46 cooperates with the gears 38 and 40 so that as a shaft 32 or 34 or the cylindrical member 46 is rotated relative to the frame 22 about its axis of rotation 33, 35 or 48 by a driving shaft, the other of the cylindrical member 46 and the shaft 32 or 34 are driven about the corresponding rotation axis 48, 33 or 35. To this end, the teeth 50 are disposed about and connected to the cylindrical member 46 so that at any rotational position about the rotation axis 48, the teeth 50 mesh with the teeth 44 of at least one of the gears 38 or 40. Consequently, either shaft 32 or 34 can be rotated about its axis 33 or 35 to effect rotation of the cylindrical member 46 about its rotation axis 48, or the cylindrical member 46 can be rotated about its rotation axis 48 to effect rotation of the shafts 32, 34 about the rotation axes 33, 35.

In order for the relative speed of rotation between a shaft 32 or 34 and the cylindrical member 46 to be adjusted, the teeth 50 are connected to the cylindrical member 46 to permit the teeth 50 to be moved, or shifted, relative to and along the length of the cylindrical member 46 while the teeth 50 are maintained in meshed relationship with the teeth 44 of at least one of the gears 38, 40. In this connection and with reference to FIG. 7, the cylindrical member 46 includes a series of grooves 124 extending through a wall of the member 46 and which spiral along the length of the member 46 from a position corresponding with one radial plane, indicated 126 in FIG. 7, to a position corresponding with another radial plane, indicated 128 in FIG. 7. As best shown in FIG. 8, each tooth 50 includes a body 130 having a recess 132 opening out of its body 130 opposite its crown, and is positioned adjacent the surface of the cylindrical member 46 so that its recess 132 is aligned with a corresponding groove 124 of the cylindrical member 46. Each tooth 50 is secured to the cylindrical member 46 with a headed fastener 134 having a shank which extends through the groove 124 and is affixed within the tooth recess 132 so that the wall of the member 46 is captured between the head of the fastener 134 and the body 130 of the tooth 50. To accommodate the sliding movement of the teeth 50 along the length of the cylindrical member 46 as the fasteners 134 are guided along the grooves 124, the width of the grooves 124 are slightly greater than the thickness of the shank of the fastener 124, and the distance as measured between the body 130 of the tooth 50 and the head of the fastener 134 is slightly greater than the thickness of the wall of the cylindrical member 46.

The transmission 20 also includes means, indicated generally 122 in FIGS. 1 and 2, for moving the teeth 50 in unison along the length of the cylindrical member 46. In the depicted transmission 20, the moving means 122 includes an annular assembly 136 (FIG. 9) positioned about the cylindrical member 46 and associated with the teeth 50 so that by moving the annular member 136 along the length of the cylindrical member 46, the teeth 50 are guided along the grooves 124 and remain in an operative, i.e., mating, relationship with the gear teeth 44. In this connection, the annular assembly 136 includes a band 137 which is positioned about the cylindrical member 46 for sliding movement therealong and includes a through-groove, or key slot 138, which extends around the circumference of the band 137 and which loosely accepts the body 130 of each tooth 50 associated with the cylindrical member 46. More specifically, the key slot 138 is slightly wider than the width of a tooth 50, as measured between its opposite sides. During movement of the band 137 along the length of the cylindrical member 46, the teeth 50 are each permitted to move and be guided along the key slot 138 as the fastener 134 is guided along the length of its corresponding groove 124.

Figure 10:
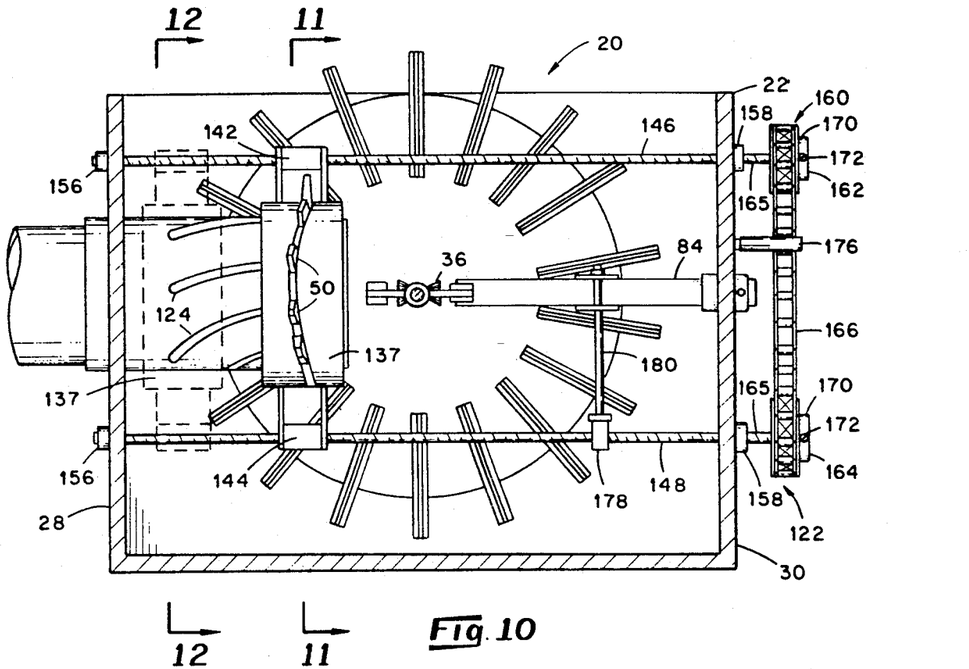
FIG. 10 is a cross-sectional view of the FIG. 1 embodiment taken about along line 10—10 of FIG. 2.

As best shown in FIG. 10, the key slot 138 of the band 137 is somewhat arcuate in shape as a path is traced along each side of the band 137 to correspond generally to the arcuate path followed by a point on the gear 38 or 40 located at a preselected radius from its axis of rotation 33 or 35. Therefore, as the band 137 is moved along the length of the cylindrical member 46 so that the teeth 50 are guided along the arcuate key slot 138 and mesh with the teeth 44 of the gears 38, 40 and the shafts 32, 34 and elongated member 46 are rotated, the arcuate shape of the key slot 138 reduces the clashing between the teeth 50 and gear teeth 44. Preferably, the involuted side surfaces, indicated 50a and 50b in FIG. 8a, of each tooth 50 are rounded in shape as a path is traced between the side faces of the tooth 50 so that the teeth side surfaces 50a, 50b are devoid of a relatively sharp corner with which to contact the teeth 44.

Figure 7:
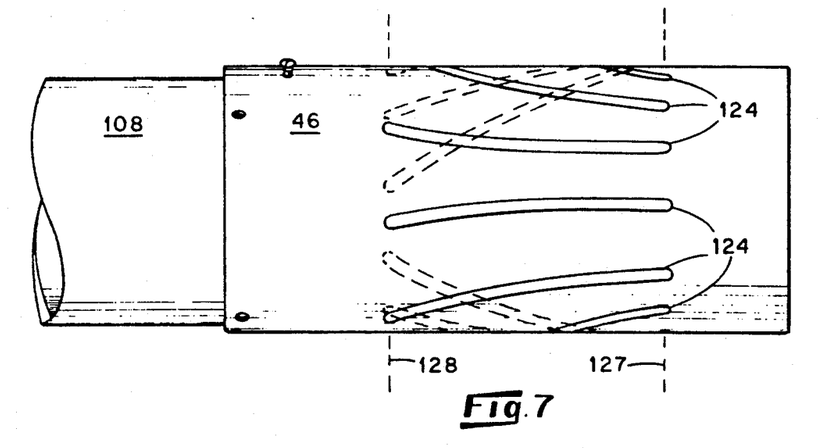
FIG. 7 is a top plan view of the cylindrical member of the FIG. 1 embodiment.
Figures 8, 8A, 9:
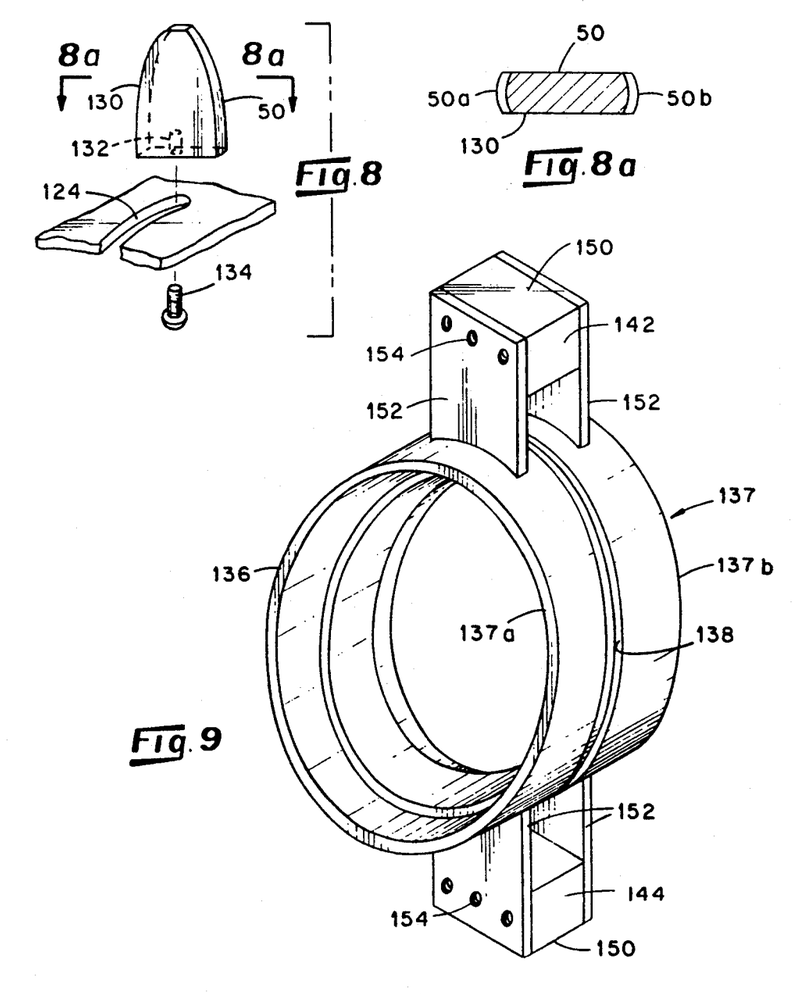
FIG. 8 is a fragmentary view of the cylindrical member/teeth assembly of the FIG. 1 embodiment.
FIG. 8a is a cross-sectional view of a speed-adjusting tooth of the FIG. 1 embodiment taken about along line 8a—8a of FIG. 8.
FIG. 9 is a perspective view of an annular assembly of the FIG. 1 embodiment.
Figure 11:
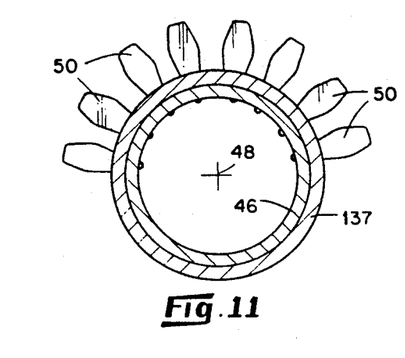
FIG. 11 is an end view of the cylindrical member/teeth assembly of the FIG. 1 embodiment illustrating schematically the arrangement of the speed-adjusting teeth when positioned at one location along the length of the cylindrical member.
Figure 12:
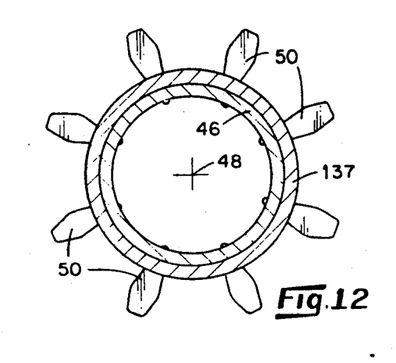
FIG. 12 is a view similar to that of FIG. 11 illustrating schematically the arrangement of the speed-adjusting teeth when positioned at another location along the length of the cylindrical member.
Figure 13:
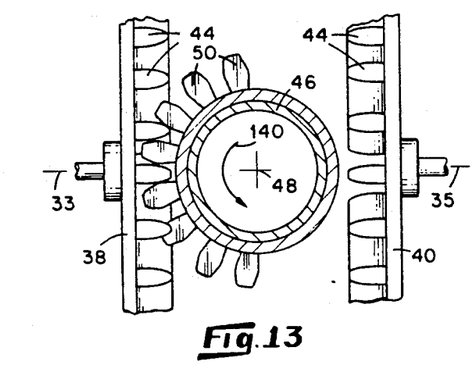
FIG. 13-16 are views illustrating schematically the relationship between the gears and speed-adjusting teeth of the FIG. 1 embodiment when the cylindrical member is arranged in alternative rotational positions.
Figure 14:
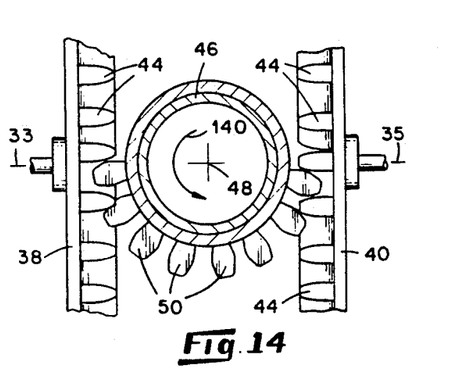
Figure 15:
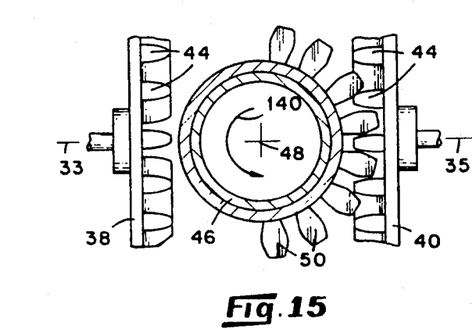
Figure 16:
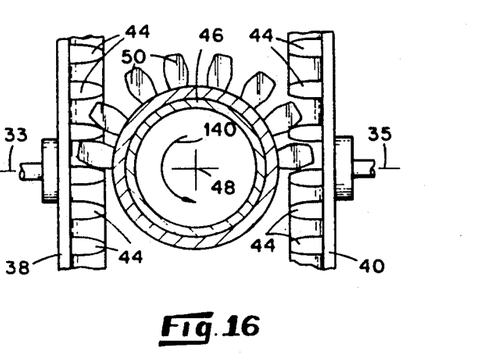
Figure 17:
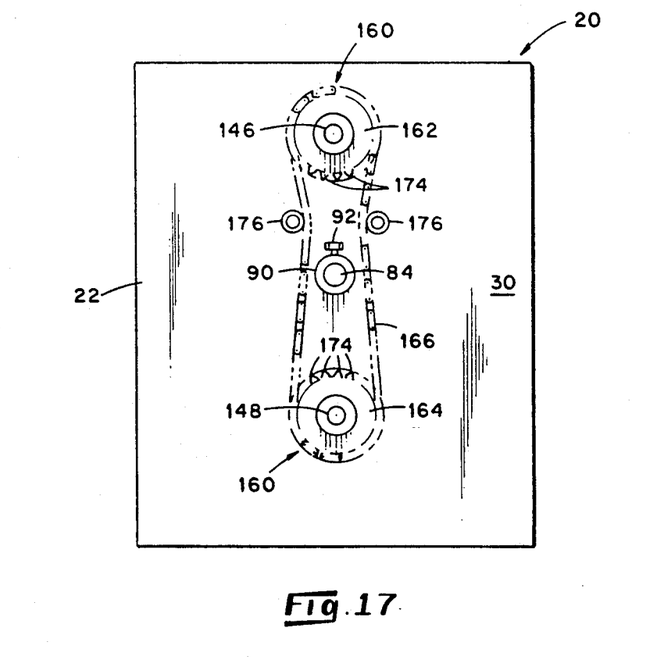
FIG. 17 is an end elevational view of the FIG. 1 embodiment as seen generally from the right in FIG. 1.

When the band 137 is positioned along the length of the cylindrical member 46 so that the teeth 50 are positioned adjacent one end of the grooves 124 adjacent the FIG. 7 radial plane 126, the teeth 50 are regularly spaced along a relatively short segment, i.e., along about one-half of, the circumference of the cylindrical member 46, as viewed in FIG. 11. When the band 37 is positioned along the length of the cylindrical member 46 so that the teeth 50 are positioned adjacent the FIG. 7 radial plane 128, the teeth 50 are regularly spaced along about the entire circumference of the cylindrical member 46, as shown in FIG. 12. As mentioned earlier, the teeth 50 cooperatively mesh with the teeth 44 of at least one of the gears 38 or 40 at any rotational position of the cylindrical member 46 about its rotation axis 48 even when closely-spaced as shown in FIG. 11. For example, there is illustrated in FIGS. 13-16, the relative position of the closely-spaced teeth 50 of FIG. 11 and gears 38, 40 at various rotational positions of the cylindrical member 46 about its rotation axis 48. More specifically, FIG. 13 illustrates the teeth 50 when meshed with the teeth 44 of gear 38, but not with the teeth of gear 40. By rotating the cylindrical member 46 in the direction of the FIG. 13 arrow 140 from the FIG. 13 position to the position illustrated in FIG. 14, the teeth 50 are positioned in meshed relationship with the teeth 44 of both gears 38 and 40. By further rotating the cylindrical member 46 in the direction of the arrow 140 from the FIG. 14 position to the position illustrated in FIG. 15, the teeth 50 are in meshed relationship with the teeth 44 of only gear 40. By still further rotating the cylindrical member 46 in the direction of the arrow 140 from the FIG. 16 position to the FIG. 17 position, the teeth 50 are in meshed relationship with the teeth 44 of both gears 38, 40. Additional rotation of the cylindrical member 46 in the direction of the arrow 140 from the FIG. 16 position returns the teeth 50 to the position of FIG. 13. Consequently, at any rotational position of the cylindrical member 46 about the rotation axis 48, the teeth 50 are in driving (or driven) relationship with the gears 38, 40.

By comparison and as mentioned earlier, when the teeth 50 along the length of the grooves 124 adjacent the FIG. 7 radial plane 128, the teeth 50 are regularly spaced about an appreciable portion of the circumference of the cylindrical member 46 as viewed in FIG. 12. Arranged in such a condition, the teeth 50 mesh with the teeth 44 of both gears 38, 40 through almost an entire revolution of the cylindrical member 46.

In order for the teeth 50 to operatively mesh with the teeth 44 of the gears 38, 40 as the teeth 50 are moved along the length of the cylindrical member 42 between the radial planes 126 and 128, the grooves 124 follow paths along the cylindrical member 46 so that the width of space between the teeth 50 when positioned at any position, or radial plane, along the cylindrical member 46 corresponds generally to the width of space between adjacent teeth 44 of the gears 38, 40 as measured along the corresponding circumferential path followed by the teeth 50 across the rotating faces 42 of the gears 38, 40. Moreover, when positioned at any radial plane along the cylindrical member 46 between the FIG. 7 radial planes 126 and 128, the teeth 50 are equally spaced from one another. Accordingly, the grooves 124 are equally spaced from one another at the corresponding radial plane, or cross-section, of the cylindrical member 46.

It follows from the foregoing that as the teeth 50 are moved along the cylindrical member 46 from the FIG. 7 radial plane 126 toward the FIG. 7 radial plane 128, the distance between the aligned rotation axes 33, 35 and the teeth 50 increases so that for a preselected rotational speed of the cylindrical member 46, the rotational speed of the shafts 32, 34 decreases. Conversely, as the teeth 50 are moved along the cylindrical member 46 from the FIG. 7 radial plane 128 toward the FIG. 7 radial plane 126, the distance between the aligned rotation axes 33, 35 and the teeth 50 decreases so that for a preselected rotational speed of the cylindrical member 46, the rotational speed of the shafts 32, 34 increases.

Thus, the relative speed of rotation between the gears 38, 40, or more particularly, the shafts 32, 34, and the cylindrical member 46 is altered, or adjusted, as the teeth 50 are moved along the cylindrical member 46 between two positions therealong.

With reference to FIG. 10 and in order to move the band 137 along the length of the cylindrical member 46 and thereby alter the relative rotational speeds between the shafts 32, 34 and the cylindrical member 46, the moving means 122 includes a pair of lug portions 142, 144 attached to the band 137 on the upper and lower sides, as viewed in FIG. 10, of the band 137, and a pair of threaded rods 146, 148 mounted within the frame 22 for rotation relative thereto and cooperable with the lug portions 142, 144 for moving the lug portions 142, 144 along the length of the cylindrical member 46 as the rods 146, 148 are rotated within the frame 22. As best shown in FIG. 9, each lug portion 142 or 144 includes a body 150 and a pair of legs 152 fixedly joined to the band 137 and the body 150 for maintaining the body 150 in a spaced relationship with the cylindrical member 46. The legs 152 of each lug portion 142, 144 are positioned on opposite sides of the key slot 138 provided in the band 137 so that the space between the legs 152 permit the passage of the teeth 50 therethrough as the band 137 is moved along the length of the cylindrical member 46. The band 137 includes two halve portions 137a, 137b disposed on opposite sides of the key slot 138 and when assembled, are positioned and held about the teeth 50 with the assembled lug portions 142, 144.

The body 150 of each lug portion 142 or 144 is provided with an internally-threaded opening 154 which extends along a path oriented substantially parallel to the rotation axis 48 of the cylindrical member 48 and which threadably accepts a corresponding one of the rods 146 or 148 as best shown in FIG. 10. Each rod 146 or 148 is rotatably supported at its opposite ends within preformed openings provided within the end walls 28, 30 of the frame 22, and each rod 146 or 148 is secured to the frame 22 with collars 156, 158 positioned about the rod 146 or 148 at locations outboard of the frame 22 and associated set screws threadably received by an opening provided within the collars 156, 158 and tightened against the rod 146 or 148. To aid in the support of the lowermost rod 148, a bearing 178 is positioned about the rod 148, and the bearing 178 is, in turn, suspended from the shaft 84 by means of a bracket assembly 180.

In order that the lug portions 142, 144 are moved in unison along the cylindrical member 46 by the rods 146, 148, the rods 146 and 148 are rotated at substantially the same speed. To this end and with reference to FIGS. 10 and 17, the transmission 20 includes a wheel and chain arrangement 160 associated with the rods 146, 148 so that rotation of One rod 146 Or 148 effects corresponding rotation of the other rod 148 or 146. More specifically, the arrangement 160 includes a pair of toothed wheels 162, 164 fixedly secured upon an end, indicated 165, of the rods 146, 148 for rotation therewith and a chain 166 looped about the toothed wheels 162, 164. Each wheel 162 or 164 includes a body 168 providing an annular surface 170 through which a set screw 172 is tightened to secure the wheel 162 or 164 to the corresponding rod 146 or 148 and a plurality of teeth 174 disposed about the periphery of the wheel 162 or 164.

The diameter of the wheels 162, 164 are equal to ensure that when the rods 146, 148 are rotated, the rods 146, 148 rotate at substantially the same rate, and the chain 166 is looped about the wheels 162 so that the links of the chain 166 intermesh with the teeth 174 of the wheels 162, 164. The chain 166 is maintained in a tensioned condition about the wheels 162 by means of a pair of pegs 176 secured within the end wall 30 of the frame 22 and disposed to the right side and left side, as viewed in FIG. 17, of the chain 166 so that the chain 166 moves in sliding engagement along the inside, or opposing, surfaces of the pegs 176. Preferably, the pegs 176 are coated with a low-friction material, such as a hard plastic, which reduces the frictional resistance between the chain 166 and the pegs 176 as the chain 166 is slidably moved across the pegs 176.

To use the transmission 20 to provide for a change of rotational speed between a driving shaft and a driven shaft, the driving shaft is suitably connected to either one of the shafts 32 or 34 or to the cylindrical member 46 so that the connected shaft 32 or 34 or member 46 acts as the input member of the transmission 20. Similarly, the driven shaft is suitably coupled to the cylindrical member 46 or to the other of the two shafts 32, 34 to which the driving shaft is connected so that this coupled member 46 or shaft 32 or 34 acts as an output member of the transmission.

During operation of the transmission 20, the driven shaft is rotated by the driving shaft through the interconnected gears 38, 40 and teeth 50 so that the driving shaft rotates at a speed proportional to the speed of the driving shaft. If it is desired that the relative speed between the driving and driven shafts be changed, one of the rods 146 or 148 is rotated within the frame 22, by, for example, a reversible servomotor (not shown) whose shaft is suitably keyed to the corresponding toothed wheel 162 or 164. Such a rotation of one of the rods 146 or 148 effects, by means of the wheel and chain arrangement 160, the rotation of the other of the rods 148 or 146 in the corresponding rotational direction so that the lug portions 142, 144 are moved in unison along the length of the cylindrical member 46 to thereby move the band 137 and teeth 50 along the length of the member 46. Since the movement of the teeth 50 along the cylindrical member 46 alters the distance between the teeth 50 and the axes of rotation 33, 35 of the shafts 32, 34, the relative speed of rotation between the shafts 32, 34 and the cylindrical member 46 is altered accordingly. More specifically, by rotating the rod 146 or 148 within the frame 22 in one rotational direction so that the teeth 50 move closer to the rotation axes 33, 35 of the shafts 32, 34, the rotational speed of the gears 38, 40 relative to that of the cylindrical member 46 is increased, and by rotating the rod 146 or 148 within the frame 22 in the opposite rotational direction so that the teeth 50 move farther from the rotation axes 33, 35 of the shafts 32, 34, the rotational speed of the gears 38, 40 relative to that of the cylindrical member 46 is decreased. The gears 38, 40 and cylindrical member 46 of the depicted transmission 20 are sized to provide a member-to-shaft speed ratio within the range of about 2:1 to 1:1 as the band 137 is moved along the cylindrical member 46 from the position shown in solid lines in FIG. 10 (corresponding to the position of the teeth 50 when positioned adjacent the FIG. 7 radial plane 126) to the position shown in phantom in FIG. 10 (corresponding to the position of the teeth 50 when positioned adjacent the FIG. 7 radial plane 128).

It follows from the foregoing that numerous modifications and substitutions can be had to the aforedescribed embodiment without departing from the spirit of the invention. For example, although the transmission 20 has been shown and described above as including two gears 38, 40 cooperable with the teeth 50 associated with the cylindrical member 46, a transmission in accordance with the broader aspects of the invention may employ more than two such gears. In such an embodiment which employs three such gears, each gear may be disposed so that its axis of rotation is coplanar with the rotation axes of the other two gears and forming an angle therewith of 120°. Furthermore, the teeth 44 of the gears 38, 40 may be arcuate in shape, rather than linear as in the depicted transmission 20.

Furthermore, a transmission embodying the principles of the present invention may utilize gears and a cylindrical member having an alternative size to those of the transmission 20 in order to provide an alternative range of member-to-shaft speed ratios. If the relative diameters between the gears and cylindrical member is large enough, the line of centers will not correspond with the theoretical pitch point. Such an absence of correspondence will effect a variance in the speed of a shaft or cylindrical member through a single revolution, but such a variance, in many applications, is negligible. Yet still further, transmissions in accordance with the principles of this invention may be connected in series, i.e. utilizing the output of one transmission as the input of another transmission, to obtain greater changes in the relative speeds between driving and driven shafts or to accommodate space limitations. Accordingly, the aforedescribed embodiment is intended for the purpose of illustration and not as limitation.

I claim:

1. A transmission comprising:
   a frame;
   a plurality of shafts journaled within the frame for rotation relative thereto and coupled to one another so that rotation of one shaft about its axis of rotation effects a rotation of each other shaft about its axis of rotation;
   a plurality of gears attached to the shafts for rotation therewith wherein each gear is associated with a corresponding one of the shafts and the gears are in spaced relation with one another;
   an elongated member journaled within the frame for rotation relative thereto;
   a plurality of speed-adjusting teeth associated with the elongated member and disposed about the circumference thereof so as to be positioned in meshed relationship with at least one of the gears at any rotational position of the elongated member about its axis of rotation for transmitting rotary motion between the shafts and the cylindrical member as a preselected shaft or the elongated member is rotated relative to the frame;
   the teeth being connected to the elongated member for movement along the length thereof between two positions therealong and cooperable with the gears so that as the teeth are moved along the elongated member between the two positions, the teeth maintain the meshed relationship with at least one of the gears as aforesaid and the distance between the teeth and the axes of rotation of the shafts is altered; and
   means for moving the teeth along the length of the elongated member between the two positions so that as the distance between the teeth and the axes of shaft rotation is altered and rotary motion is transmitted between a preselected shaft and the elongated member through the teeth and the gears, the relative speed of rotation between the preselected shaft and the elongated member is altered.

2. The transmission as defined in claim 1 wherein the shafts are supported within the frame so that the axes of rotation of the shafts are arranged in substantially one plane, and the elongated member is supported within the frame so that the axis of rotation of the elongated member is substantially perpendicular to the one plane.

3. The transmission as defined in claim 2 wherein there are two shafts and the shafts are supported within the frame so that the axes of rotation of the two shafts are colinear.

4. The transmission as defined in claim 1 wherein each gear has a plurality of teeth which extend generally radially of the axis of rotation of the corresponding shaft so that the spacing between adjacent teeth of each gear increases as a path is traced radially outwardly of the center of the gear, and the speed-adjusting teeth are connected to the elongated member so that when the speed-adjusting teeth are moved along the length of the elongated member between the two positions, the width of spacing between adjacent teeth of the speed-adjusting teeth is adjusted to correspond to the width of spacing between the teeth of the gear at which the speed-adjusting teeth mesh with the gear teeth.

5. The transmission as defined in claim 1 wherein the elongated member is cylindrical in form and has series of grooves which extend along the length of the elongated member and the speed-adjusting teeth are connected to the elongated member so that as the speed-adjusting teeth are moved along the length thereof, the speed-adjusting teeth are guided along the grooves.

6. The transmission as defined in claim 5 wherein the elongated member includes sidewalls through which the grooves extend, and each tooth of the speed-adjusting teeth includes a body and means for connecting each tooth of the speed-adjusting teeth to the cylindrical member, the connecting means including means extending through each groove and attached to the body of a corresponding tooth of the speed-adjusting teeth so that each tooth of the speed-adjusting teeth is captured by a corresponding groove.

7. The transmission as defined in claim 1 wherein the means for moving the teeth includes annular means positioned about the elongated member for movement therealong and associated with the speed-adjusting teeth so that by moving the annular means along the length of the elongated member, the speed-adjusting teeth move along the elongated member by a corresponding amount.

8. The transmission as defined in claim 7 wherein annular means includes means defining a key slot extending circumferentially of the elongated member, the speed-adjusting teeth are positioned within the key slot and are adapted to move along the key slot as the teeth are moved along the length of the cylindrical member with the annular means.

9. The transmission as defined in claim 8 wherein the annular means includes a body member joined to the key slot-defining means, the body member includes an internally-threaded opening therein, and the moving means includes a threaded rod which is threadably received by the internally-threaded opening of the body member and rotatably supported by the frame so that by rotating the rod relative to the frame, the key slot-defining means is moved along the length of the elongated member to thereby move the speed-adjusting teeth along the length of the cylindrical member.

10. A transmission comprising:

a frame;

at least two shafts rotatably supported by the frame;

means associated with the two shafts so that rotation of one shaft effects a rotation of the other shaft;

two gears associated with the shafts wherein each gear is joined to a corresponding one of the two shafts for rotation therewith and has a plurality of teeth;

speed-adjusting means including an elongated member rotatably supported by the frame for rotation about the longitudinal axis of the elongated member and a plurality of teeth associated with the elongated member and arranged along the perimeter of the elongated member and cooperating with the gears so as to transmit rotary motion between the shafts and the elongated member as a preselected one of the shafts or the elongated member is rotated about its longitudinal axis;

the teeth of the speed-adjusting means being attached to the elongated member for movement along the length thereof and being cooperable with the teeth of the gears so that movement of the teeth of the speed-adjusting means along the length of the elongated member while a preselected one of the two shafts and elongated member is rotated relative to the frame effects an adjustment in the relative speed of rotation between the shafts and the elongated member; and means for moving the teeth of the speed-adjusting means along the length of the elongated member to alter the speed of rotation of the shafts relative to the speed of rotation of the elongated member when the preselected one of the two shafts and elongated member is rotated relative to the frame.

11. The transmission as defined in claim 10 wherein the shafts are supported within the frame so that the axes of rotation of the shafts are arranged in substantially one plane, and the elongated member is supported within the frame so that the axis of rotation of the elongated member is substantially perpendicular to the one plane.

12. The transmission as defined in claim 11 wherein there are two shafts and the shafts are supported within the frame so that the axes of rotation of the two shafts are colinear.

13. The transmission as defined in claim 10 wherein the teeth of each gear which extend generally radially of the axis of rotation of the corresponding shaft so that the spacing between adjacent teeth of each gear increases as a path is traced radially outwardly of the center of the gear, and the teeth of the speed-adjusting means are connected to the elongated member so that when the teeth of the speed-adjusting means are moved along the length of the elongated member, the width of spacing between adjacent teeth of the speed-adjusting means is adjusted to correspond with the width of spacing between the teeth of the gears at which the teeth of the speed-adjusting means mesh with the gear teeth.

14. The transmission as defined in claim 10 wherein the elongated member is cylindrical in form and has series of grooves which extend along the length of the elongated member and the teeth of the speed-adjusting means are connected to the elongated member so that as the teeth of the speed-adjusting means are moved along the length of the elongated member, the teeth of the speed-adjusting means are guided along the grooves.

15. The transmission as defined in claim 14 wherein each tooth of the speed-adjusting means includes a body and means for connecting the body of the tooth to the elongated member so that each tooth of the speed-adjusting means is captured by a corresponding groove.

16. The transmission as defined in claim 10 wherein the means for moving the teeth includes annular means positioned about the elongated member for movement therealong and associated with the speed-adjusting teeth so that as the annular means are moved along the length of the elongated member, the speed-adjusting teeth are moved along the elongated member by a corresponding amount.

17. The transmission as defined in claim 16 wherein annular means includes means defining a key slot extending substantially circumferentially of the elongated member, and the speed-adjusting teeth are positioned within and cooperate with the key slot so that as the annular means and speed-adjusting teeth are moved along the length of the elongated member, the speed-adjusting teeth are guided along the key slot.

18. The transmission as defined in claim 17 wherein the annular means includes means providing an internally-threaded opening therein, and the moving means includes a threaded rod which is threadably received by the internally-threaded opening and rotatably supported by the frame so that by rotating the rod relative to the frame, the annular means is moved along the length of the elongated member to move the speed-adjusting teeth along the length of the cylindrical member.

19. A transmission comprising:

a frame;

at least two shafts rotatably supported by the frame;

means for coupling the two shafts so that rotation of one shaft effects a rotation of the other shaft;

two gears associated with the shafts wherein each gear is joined to a corresponding one of the two shafts for rotation therewith and includes a plurality of teeth;

a cylindrical member rotatably supported by the frame for rotation about an axis corresponding with the longitudinal axis of the cylindrical member;

a plurality of speed-adjusting teeth arranged along the perimeter of the cylindrical member for rotation therewith and meshing with the teeth of at least one of the gears at every rotational position of the cylindrical member for transmitting rotary motion between the gears and the speed-adjusting teeth as the shafts and the cylindrical member are rotated relative to the frame;

the speed-adjusting teeth being attached to the cylindrical member for movement along the length thereof and being cooperable with the teeth of the gears so that as the speed-adjusting teeth are moved along the length of the cylindrical member, the speed-adjusting teeth remain meshed with the teeth of at least one of the gears as aforesaid and so that movement of the speed-adjusting teeth along the length of the cylindrical member during rotation of the shafts and cylindrical member effects an adjustment in the relative speed of rotation between the shafts and the cylindrical member; and means for moving the speed-adjusting teeth along the length of the cylindrical member to effect an adjustment in the relative speed of rotation between the shafts and the cylindrical member while the shafts and the cylindrical member are rotated.

20. The transmission as defined in claim 19 wherein the shafts are rotatably supported by the frame for rotation relative thereto about axes arranged substantially in a single plane, and the cylindrical member is rotatably supported by the frame for rotation relative thereto about an axis oriented substantially perpendicular to the single plane.

* * * * *